United States Patent
Ashworth

Patent Number: 5,321,614
Date of Patent: Jun. 14, 1994

[54] NAVIGATIONAL CONTROL APPARATUS AND METHOD FOR AUTONOMUS VEHICLES

[76] Inventor: Guy T. D. Ashworth, 2910 Hatley Dr., Austin, Tex. 78746

[21] Appl. No.: 711,196

[22] Filed: Jun. 6, 1991

[51] Int. Cl.$^5$ .............................................. G06F 15/50
[52] U.S. Cl. ............................... 364/424.02; 318/587; 180/167; 180/169
[58] Field of Search .................... 364/424.02; 318/587; 395/95; 15/319; 180/167, 168, 169

[56] References Cited

U.S. PATENT DOCUMENTS

| | | | |
|---|---|---|---|
| 4,119,900 | 10/1978 | Kremnitz | 318/587 |
| 4,674,048 | 6/1987 | Okumura | 318/587 |
| 4,700,427 | 10/1987 | Knepper | 318/587 |
| 4,860,209 | 8/1989 | Sugimoto et al. | 364/424.02 |
| 4,962,453 | 10/1990 | Pong et al. | 364/424.02 |
| 5,001,635 | 3/1991 | Yasutomi et al. | 364/424.02 |
| 5,032,775 | 7/1991 | Mizuno et al. | 364/424.02 |
| 5,204,814 | 4/1993 | Noonan et al. | 364/424.02 |
| 5,229,941 | 7/1993 | Hattori | 364/424.02 |

*Primary Examiner*—Gary Chin
*Attorney, Agent, or Firm*—Shaffer & Culbertson

[57] ABSTRACT

A navigational apparatus and method is provided for autonomous vehicles having digitally controlled drive means for driving the vehicle along a line in either forward or rearward direction and for turning the vehicle either clockwise or counterclockwise with zero turning radius. The navigational apparatus includes obstacle sensors connected to the vehicle for producing an obstacle signal in response to contact or other desired proximity between an obstacle and a vehicle as the vehicle is driven through a work area. The work area comprises a substantially horizontal planar work surface bounded on all sides by an obstacle. The navigational apparatus also includes a search memory storage device connected to the vehicle for storing a two-dimensional memory array comprising a sufficient number of array elements to represent the work area to a desired resolution and with each array element representing a unique work area increment within the work area. A data processing device connected to the vehicle communicates with the memory storage device to produce a plurality of drive signals capable of directing the vehicle's drive motors to drive the vehicle from an origin work area increment into successive work area increments until the entire work area is explored. The obstacle sensors produce obstacle signals when the vehicle encounters an obstacle in the work area and these obstacle signals are used by the data processor to navigate the vehicle around the obstacles.

14 Claims, 5 Drawing Sheets

NAVIGATIONAL CONTROL APPARATUS AND METHOD FOR AUTONOMUS VEHICLES

BACKGROUND OF THE INVENTION

This invention relates to navigation systems for mobile robots or autonomous vehicles, and more particularly to a navigational apparatus and method for guiding an autonomous vehicle throughout a work area.

Robotic devices are commonly used to perform repetitive, difficult, or dangerous tasks that must otherwise be performed manually. One desirable application of robotics involves operating a vehicle within a work area to perform some task on the work area surface. Examples of these tasks are mowing lawns, or waxing or vacuuming floors. The robotic device in these operations must be navigated to efficiently cover the entire desired work area so as to perform the desired task while avoiding obstacles within the area.

A number of prior devices are adapted to cover a work area to perform some task on the surface of the work area. These devices include a mobile robot or autonomous vehicle carrying equipment such as a vacuum, for example, for performing the desired task. The vehicle or robot is navigated by a guidance system to cover the work area. There were numerous drawbacks, however, with the prior mobile robot or autonomous vehicle navigational systems. In some cases the mobile robots had navigational systems that caused the robot to follow a fixed guide positioned in the floor of the work area. However, these fixed guides were impractical in many situations. Other mobile robot devices required a built-in map of the work area indicating its various boundaries and obstacles. This built-in map was expensive in terms of time and inconvenience and limited the use of the device to work areas for which maps had been created. Still other devices had to be manually guided around the boundaries of the work area in a learn mode to teach the guidance system the boundaries of the work area. This required manual supervision that the device was intended to eliminate. Also, robots which operate from a preprogrammed map are incapable of coping with obstacles that are in conflict with the programmed work area. Other mobile robot or autonomous vehicle navigating devices did not require a fixed guide in the work area, built-in maps, or manually performed learn modes, but did require elaborate sensors and range finding devices to sense work area boundaries and obstacles and also required elaborate computer hardware. This elaborate computer hardware and sensor arrangement made these prior mobile robot navigational devices prohibitively expensive for many applications.

SUMMARY OF THE INVENTION

It is a general object of the invention to provide a mobile robot or autonomous vehicle navigational apparatus and method that overcomes the above-described disadvantages and others associated with prior navigational devices and methods.

The navigational apparatus and method according to the invention is adapted to guide an autonomous vehicle or mobile robot through a substantially horizontal work area bounded on all sides by an obstacle and having an arbitrary shape. Other arbitrarily shaped obstacles may be included within the work area. The vehicle includes drive means for driving the vehicle along a line in either a forward or rearward direction and for turning the vehicle either clockwise our counterclockwise with zero turning radius.

The navigational apparatus includes obstacle sensor means, search memory storage means, and data processing means. The data processing means receives signals from the obstacle sensor means and communicates with the search memory storage means to provide a plurality of drive signals capable of driving the vehicle throughout the work area.

The obstacle sensor means is mounted on the vehicle and produces an obstacle signal any time the vehicle encounters an obstacle as the vehicle moves through the work area. An obstacle may be an obstacle at the boundary of the work area such as a wall or closed door, and may also be a sudden drop-off such as a stairwell. An obstacle may also be an object placed in the work area or a stair step. The obstacle sensor means preferably includes a plurality of object contact switches and vertical switches, each adapted to produce the obstacle signal. The object contact switches are placed at various positions around the periphery of the vehicle to produce the obstacle signal when the vehicle physically contacts an obstacle such as a wall or a piece of furniture. The vertical switches are also positioned at various points around the periphery of the vehicle and are adapted to sense a sudden drop-off from the work area surface and to provide an obstacle signal when such a drop-off is encountered.

The search memory storage means is also mounted on the vehicle and comprises a digital memory storage device capable of storing a two-dimensional memory array comprising a plurality of array elements. Each array element in the two-dimensional memory array represents a unique work area increment within the work area in which the vehicle is to operate, and the array includes sufficient array elements to represent the entire work area to a desired resolution.

Each array element in the memory array is capable of storing several different indicators or markers produced by the processing means. These markers include a work area increment status marker, an origin marker, and a direction vector. The status marker indicates whether the particular work area increment represented by that particular array element has been explored or covered by the vehicle, is unexplored, or contains an obstacle. The origin marker in an array element indicates that the corresponding work area increment is the initial location of the vehicle in the work area when the work commenced. The direction vector in an array element indicates the direction taken by the vehicle to initially enter the particular work area increment represented by the array element.

The data processing means is mounted on the vehicle and comprises a computer that is operated to create drive signals for the drive means that are capable of driving the vehicle from the origin work area increment to successive work area increments until the vehicle again reaches the origin work area increment and all adjacent increments have been explored or contain an obstacle marker. Starting from an initial position within the work area, the data processing means clears the memory array, creating unexplored markers in the status location of each array element, then records the origin marker in the center array element indicating the current location of the vehicle within the work area. At each work area increment the data processing means analyzes the memory contents of array elements adjacent to the array element representing the current location of the vehicle within the work area to determine whether an adjacent array element is unexplored or includes an explored or obstacle marker at the status location in the array element. When the processing means locates an adjacent array element that is unexplored, it produces an explore response which generates a drive signal capable of directing the drive means to drive the vehicle to the work area increment represented by that array element, places an explored marker in the status area of the array element, and places a direction vector in the array element indicating the direction taken to reach the corresponding work area increment.

When the vehicle encounters an obstacle when operating under a drive signal generated in an explore response, the obstacle sensors produce an obstacle signal that is received by the data processing means. The data processing means initiates a return or obstacle response in response to the obstacle signal. The return response generates signals for the drive means that cause the vehicle to stop and then causes the vehicle to return to the last occupied work area increment. The return response also causes the data processing means to record an obstacle marker in the status location of the array element representing the work area increment in which the obstacle was encountered.

When the data processing means analyzes the memory contents of array elements representing adjacent work area increments and does not locate an unexplored marker and the array element representing the current position of the vehicle does not contain the origin marker, the data processing means produces a back-track response. The back-track response generates drive signals to drive the vehicle in a direction opposite to the direction vector contained in the array element corresponding to the work area increment in which the back-track response is produced. After the vehicle reaches the next adjacent work area increment after initiating a back-track response, the device again scans the memory contents of adjacent array elements for an unexplored marker. Back-track responses and explore responses are produced until the vehicle reaches the origin work area increment and no array element representing an adjacent work area increment contains an unexplored marker.

There exists the possibility that while the vehicle is being driven by a drive signal generated in a back-track response, an obstacle will be encountered in a work area increment which was previously found to be obstacle free. This possibility arises due to mechanical error in the positioning of the vehicle or by an obstacle being placed in the work area while the vehicle is operating. When an obstacle signal is received while the vehicle is executing a back-track response, the data processing means operates to analyze the memory contents of array elements representing adjacent work area increments to determine whether a neighboring work area increment has an obstacle or is unexplored. If a neighboring work area increment does contain an obstacle or is unexplored as evidenced by the status location contents of the corresponding memory array element, the data processing means initiates a back-track error adjustment response. This back-track error adjustment response produces drive signals for the drive means to move the vehicle a slight distance from the suspect neighboring work area increment. After the adjustment, back-track response is resumed. If an obstacle signal is produced while the vehicle is executing a back-track response and no suspect neighboring work area increment is found by the data processing means, the vehicle is reinitialized by the data processing means to clear the memory array and start the navigation process over from the new work area increment.

The navigational apparatus according to the invention overcomes several of the problems found in prior autonomous vehicle navigational devices. First, the object sensors may be relatively inexpensive electromechanical sensors or switches. The use of electromechanical sensors greatly reduces the cost of the device as compared to the optical and ultrasonic range finding devices employed by prior systems. Also, the computer that comprises the data processing means of the present invention does not require high processing rates and therefore further reduces the cost of the system. Furthermore, the search memory storage means of the invention may be implemented using relatively inexpensive memory devices and requires no pre-programming for each individual work area. Also, by backtracking in reverse the device eliminates some of the systematic mechanical error that is accumulated during initial exploration of the work area.

These and other objects, advantages, and features of the invention will be apparent from the following description of the preferred embodiments, considered along with the accompanying drawings.

DESCRIPTION OF THE PREFERRED EMBODIMENTS

Figure 1:
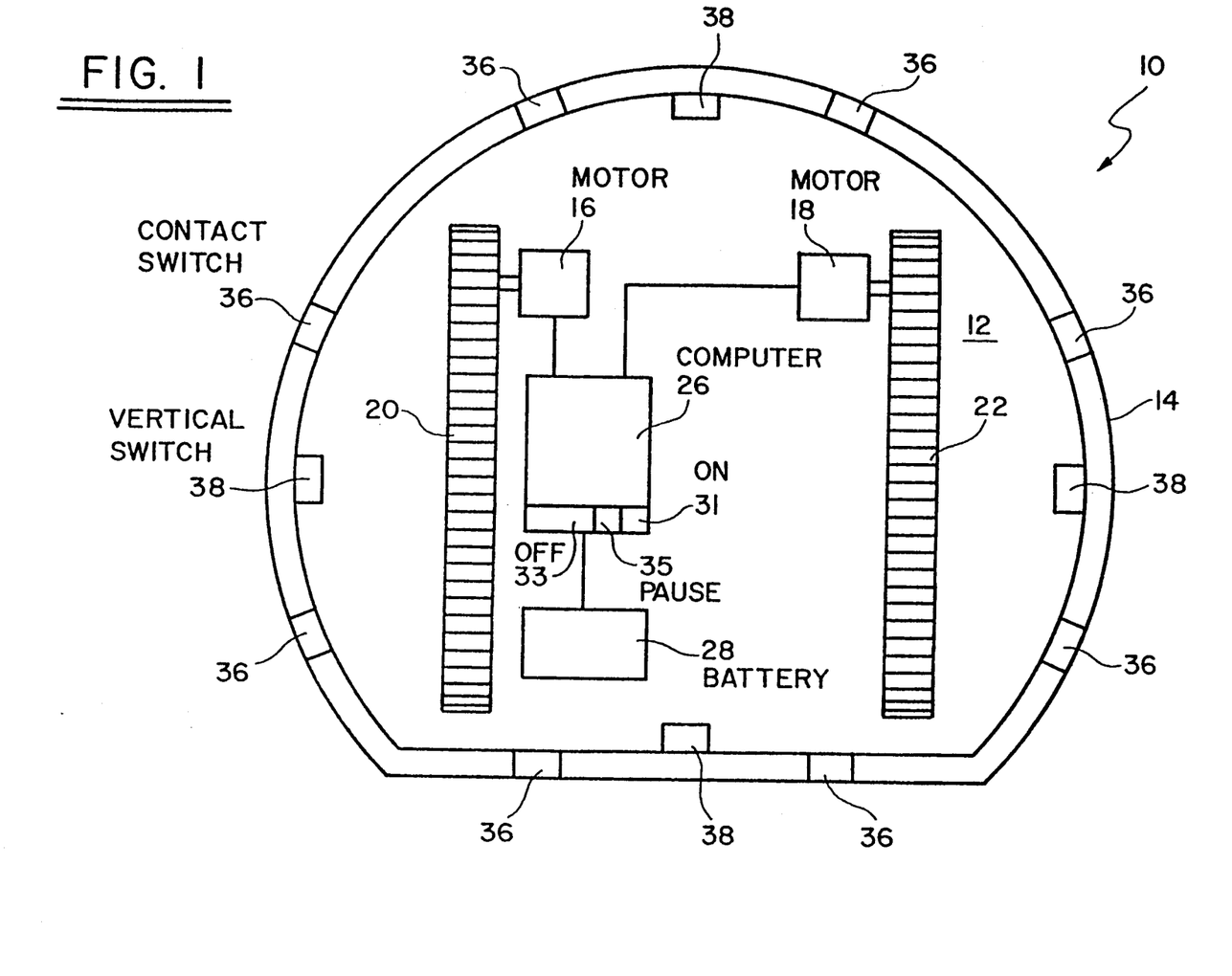
FIG. 1 is a schematic plan view of an autonomous self-navigating vehicle embodying the principles of the invention.

A navigational control apparatus and method embodying the principles of the invention is adapted to guide a vehicle 10 shown in FIG. 1 through a work area. The vehicle 10 includes a vehicle frame 12 and preferably a vehicle shell or body 14. The vehicle shell 14 is movably suspended over the frame 12 by suitable means so that it is capable of moving slightly in substantially any direction in relation to the vehicle frame. Drive means for the vehicle includes two digitally controlled motors 16 and 18 for driving two laterally spaced apart treads 20 and 22 connected to the vehicle frame 12. The two digitally controlled motors 16 and 18 are preferably stepper motors, although other types of electric motors may be used with a suitable encoder for encoding the rotation of the motor drive shaft to facilitate digital control.

Although other drive means may be used with the navigational apparatus embodying the principles of the invention, the drive means shown in FIG. 1 is well suited to provide the drive requirements of the navigational system according to the invention and is therefore preferred. The navigational control apparatus of the invention requires drive means capable of operating in response to a suitable digital drive signal to drive the vehicle along a line in either a forward or rearward direction and to turn the vehicle either clockwise or counterclockwise with zero turning radius. The vehicle is driven according to the method of the invention in one of four directions along perpendicular lines. For purpose of illustration, these directions may be described as north, east, south, and west although the directions do not necessarily correspond to their geographical counterparts. Those skilled in the art will readily appreciate a number of different drive arrangements capable of performing these drive requirements.

Figure 2:
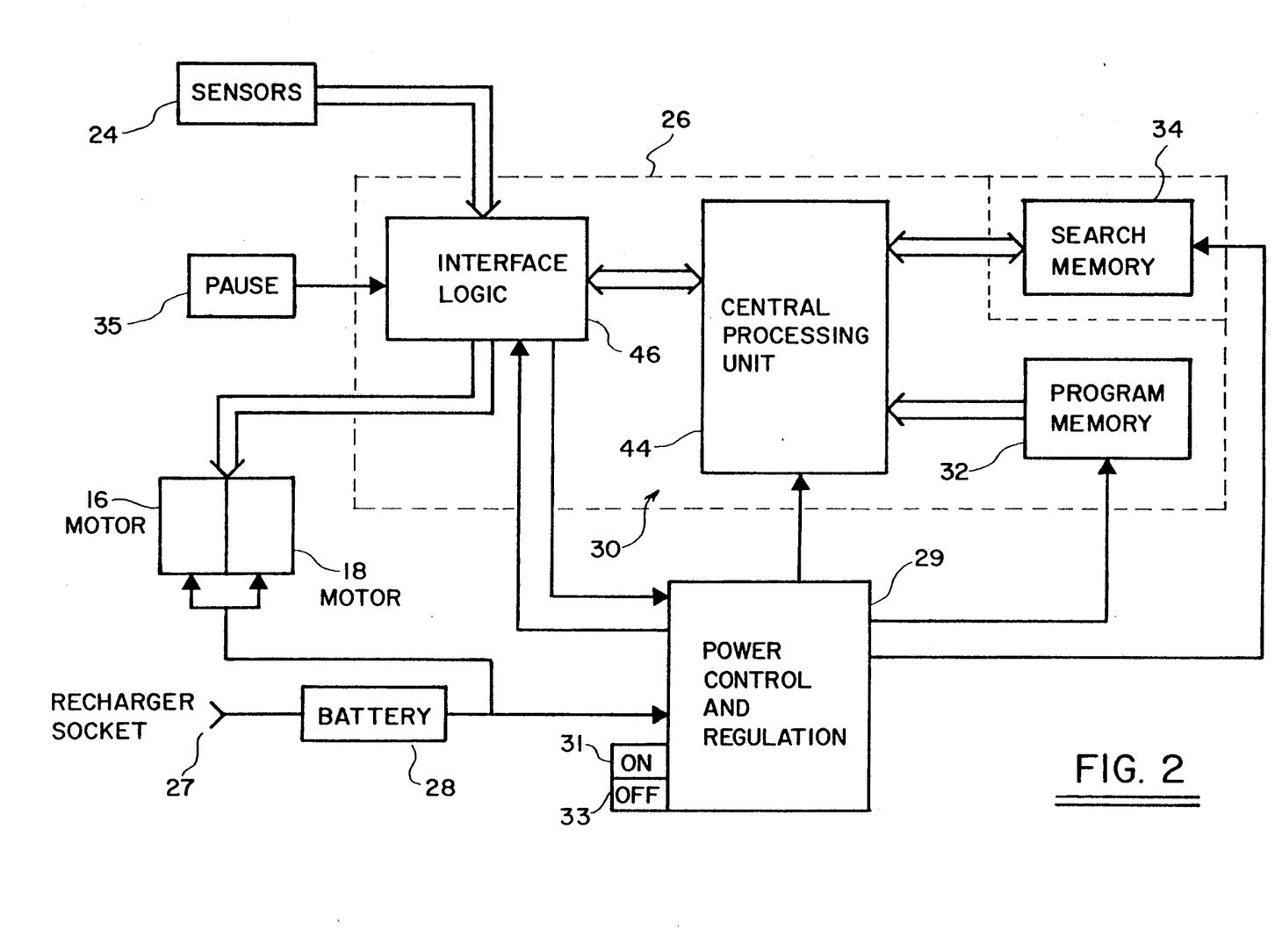
FIG. 2 is a block diagram of the navigational control apparatus embodying the principles of the invention.

As shown best in FIG. 2 the navigational apparatus embodying the principles of the invention includes obstacle sensor means 24, a computer 26, and a battery 28 for powering the computer as well as the drive motors 16 and 18. A built-in recharger socket 27 is preferably provided for recharging the battery 28 and a power regulator 29 is provided to regulate the power for the computer 26. The computer 26 includes search memory storage means 34 and data processing means 30 including program memory storage means 32. As shown in FIGS. 1 and 2, the apparatus further includes an external on control 31, off control 33, and pause control 35. The obstacle sensor means 24 (shown in FIG. 2) comprises two different types of preferably electro-mechanical switches. Referring to FIG. 1, a plurality of object contact switches 36 are positioned at various points around the periphery of the vehicle 10 between the vehicle frame 12 and the vehicle shell 14, and a plurality of vertical switches 38 are connected to the vehicle frame at various points around its periphery. The object contact switches 36 positioned between the vehicle frame 12 and vehicle shell 14 are each capable of providing an obstacle signal when the shell at that particular location is moved toward the frame. Such relative movement between the shell 14 and frame 12 occurs any time the vehicle 10 is driven by the drive means into an obstacle such as a wall or a piece of furniture. Although eight object contact switches 36 are shown in FIG. 1 for purposes of illustration, more or fewer such switches may be used depending on the size and shape of the particular vehicle. In any case, a sufficient number of object contact switches 36 are used to insure that an obstacle signal is produced any time the vehicle is driven into contact with an object at substantially any point about the periphery of the vehicle shell 14.

The vertical switches 38 each preferably comprise an electro-mechanical switch that contacts the surface of the work area as the vehicle is driven there along and is capable of producing an obstacle signal when surface contact is lost due to a vertical drop greater than a predetermined magnitude. Such a drop may be a stair step or some other type of step that the vehicle cannot traverse and therefore represents an obstacle to the vehicle. The four vertical switches 38 shown in FIG. 1 are shown by way of example and more or fewer vertical switches may be employed according to the invention depending upon the size and shape of the vehicle and also depending on the particular drive means that the vehicle employs.

The obstacle signals produced by the vertical switches 38 and by the object contact switches 36 are undifferentiated. The occurrence of an obstacle signal, whether produced by a vertical switch 38 or an object contact switch 36, indicates that the vehicle has been driven to a point in the work area beyond which the vehicle may not travel. Such a point may represent a boundary wall, an obstacle such as a piece of furniture or other article located within the work area, or a step within or bounding the work area.

The search memory storage means 34 included in the computer mounted on the vehicle frame 12 comprises a memory storage device capable of storing a two-dimensional memory array comprising a plurality of memory array elements (not shown). Each individual array element in the memory array represents a unique work area increment in the work area through which the vehicle is to be guided by the navigational apparatus according to the invention. A sufficient number of array elements are included in the memory array for the array to represent the entire work area in which the vehicle is to operate.

Each array element in the memory array is capable of storing a status marker, a direction vector, and an origin marker. The status marker may be either an unexplored marker, an explored marker, or an obstacle marker. The unexplored marker indicates that the work area increment that the array element represents has not been traversed by the vehicle, while the explored marker indicates that the corresponding work area increment has been traversed. The obstacle marker indicates that the vehicle has traversed the corresponding work area increment and has located an obstacle in the work area increment. The direction vector contained in a memory array element indicates the direction in which the vehicle is driven to reach the particular work area increment which that array element represents. An array element containing the origin marker represents the work area increment that is the origin or initial position of the vehicle within the work area when the apparatus commences operation according to the method of the invention.

Each preferred memory array element comprises a single byte of memory space. The status marker may be one of three states and thus requires two bit locations in the memory byte. The direction vector may be one of four directions and therefore also requires two bit locations in each memory array element byte. Only a single bit in each memory array element is required for the origin marker.

The data processing means 30 includes the computer's central processing unit CPU 44, an interface logic device 46, and the program memory storage device 32. The program memory storage device 32 may be any suitable storage device for storing the algorithm by which the data processing means operates according to the method of the invention. The interface logic device 46 provides a suitable interface between the signals produced by the obstacle sensors 36 and 38 and the CPU 44 and also provides an interface between the drive signals generated by the CPU 44 and the signals required to drive the digitally controlled motors 16 and 18 of the drive means.

The CPU 44 operates under the direction of the program retained in the program memory storage device 32 to scan the search memory storage means 34 and record appropriate origin and status markers and direction vectors in individual memory array elements in response to such scans and signals received from the obstacle sensors. The CPU 44 also operates in response to the program to create drive signals which after conditioning by the interface logic device 46, are capable of directing the drive motors 16 and 18 to drive the vehicle 10 into successive work area increments until the entire work area is covered or explored by the vehicle to a desired resolution. The resolution is limited by the number of array elements available in the search memory storage device 34.

Figure 3A:
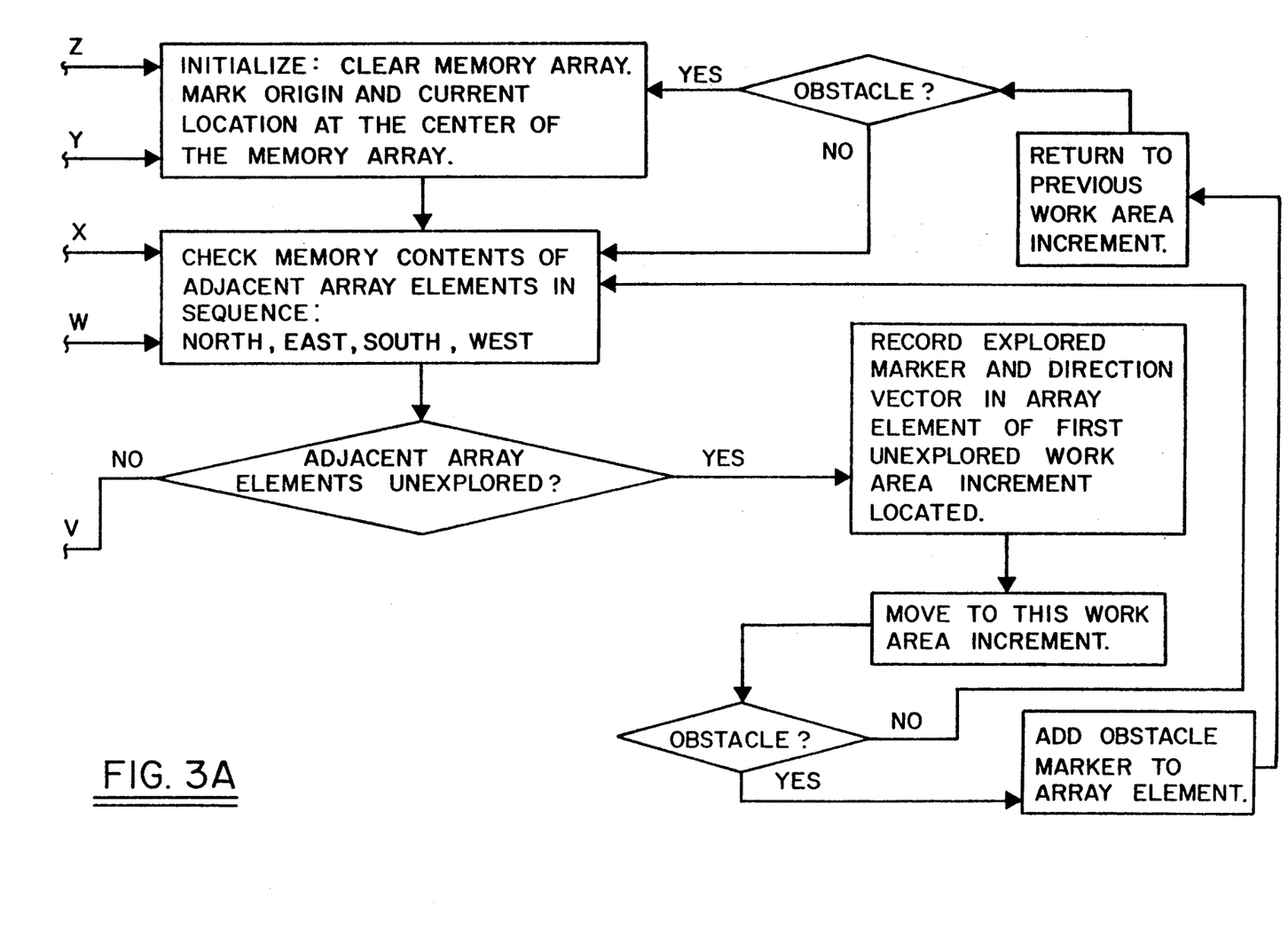
FIGS. 3A and 3B are a flow chart of operational steps performed by the navigational apparatus embodying the principles of the invention.
Figure 3B:
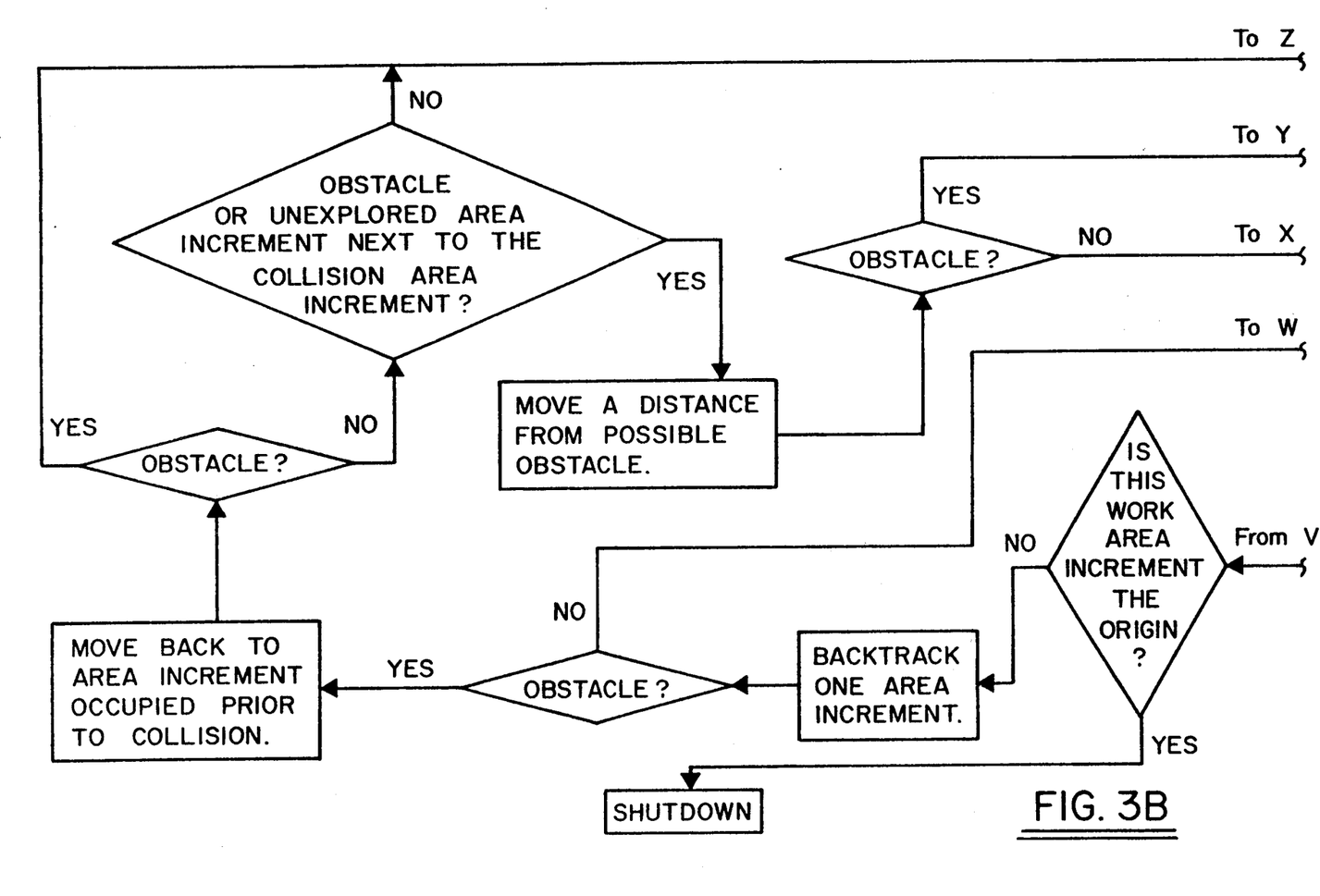

The operation and method of navigational control performed by the apparatus according to the invention may be described with reference to FIGS. 3A and 3B. FIGS. 3A and 3B indicate the two primary loops in the operation of the device. FIG. 3A shows a search loop while FIG. 3B shows a back track loop. The CPU 44 and program memory device 32 implement initializing means within the data processing means for clearing the search memory storage device 34, placing an unexplored marker in each memory array element, and recording an origin marker in the center array element. The initializing means performs this initializing step when the vehicle 10 is positioned in the work area and turned on using the on control 31. On initialization, the work area increment represented in the memory array by the array element that includes the recorded origin marker represents the current location of the vehicle 10 in the work area.

After initialization, search processing means implemented by the CPU 44 and program memory device 32 analyzes the memory contents of each adjacent array element, each adjacent array element representing one of the work area increments that is adjacent to the origin work area increment. As used herein, an adjacent work area increment is a work area increment immediately adjacent the current work area increment in one of the four directions in which the vehicle is driven, that is north, south, east, or west, again not necessarily corresponding to the geographical directions. The analysis of adjacent array elements is conducted in a predetermined sequence, for example north, east, south, and west. When the search processing means in its analysis finds an adjacent memory array element that includes an unexplored marker in the status location, the search processing means implemented in the CPU 44 and program 32 also initiates an explore response that produces a drive signal which is directed through the interface logic device 46 to the drive motors 16 and 18 to drive the vehicle 10 to the adjacent work area increment represented by the array element that included the unexplored marker.

Preferably prior to producing the drive signal, the explore response causes memory array mapping means also implemented in the CPU 44 and program memory 32 to record an explored marker and a direction vector in the memory array element representing the work area increment to which the vehicle will be driven in response to the drive signal. The explored marker is recorded in the status section of the array element and indicates that the corresponding work area increment has been covered or explored by the vehicle 10. The direction vector indicates the direction, north, east, south, or west that the vehicle 10 originally takes to reach the particular work area increment.

The CPU 44 and program memory device 32 also implement return means for executing a return response when an obstacle signal is produced while the drive means including motors 16 and 18 operate in response to one of the drive signals produced in an explore response. If the vehicle outer shell 14 contacts an obstacle or if the vehicle 10 encounters a vertical drop as it is driven in response to the drive signal, the sensors 36 or 38 produce an obstacle signal The obstacle signal is received by the CPU 44 through the interface device 46 and the CPU responds in accordance with the program in program memory 32 to initiate the return response. If no obstacle is encountered as the vehicle 10 is driven in response to a drive signal produced in an explore response, the search processing means again analyzes the memory contents of adjacent array elements from the new location, attempting to locate further unexplored work area increments.

Each return response generates signals to stop the drive motors 16 and 18 and then cause the motors to drive the vehicle 10 in the opposite direction to the work area increment or position from which the vehicle was being driven when the obstacle signal was produced. Since the obstacle may be encountered at any point within a work area increment, the CPU 44 and program memory 32 continually monitor the distance traveled by the vehicle in response to any drive signal. After the vehicle is stopped by a return response, the distance traveled thus far during the drive signal is thus available for determining the distance the vehicle must be driven in reverse to reach the last occupied work area increment or position.

The return response also causes the memory array mapping means to record an obstacle marker in the status location of the array element representing the work area increment into which the vehicle was being driven in response to the drive signal when the obstacle signal was produced. The navigational apparatus thus learns the exterior boundaries of the work area and the boundaries of any obstacles within the work area by feeling its way around the work area and recording the results of its exploration in the status location of each array element representing an area increment travelled.

If an obstacle is encountered and an obstacle signal produced as the vehicle is being driven by a drive signal produced in a return response, the initializing means implemented in the CPU 44 and program memory device 32 repeats the initializing step and the vehicle 10 starts its search again from a new origin work area increment. The number of allowed re-initializations can be set as necessary for the application. If no obstacle is encountered while the vehicle 10 is driven in a return response, the vehicle continues on until reaching the previously occupied work area increment and then the search processing means operates again to locate an adjacent array element having an unexplored marker.

The data processing means also includes back-track processing means implemented in the CPU 44 and program memory device 32. When the search processing means analyzes the memory contents of array elements adjacent to the array element that represents the current work area increment and determines that each adjacent array element contains an explored marker or an obstacle marker but no origin marker, the back-track processing means initiates a back-track response. The back-track response produces a drive signal that is capable of directing the drive motors 16 and 18 to drive the vehicle 10 rearwardly to the next adjacent work area increment in the direction opposite to the direction indicated by the direction vector recorded in the array element representing the work area increment in which the back-track response was initiated. Thus, the back-track response backs the vehicle up and then continues the memory analyzing step performed by the search processing means.

The data processing means 30 also includes back-track error compensating means implemented in the CPU 44 and program memory device 32. The back-track error compensating means operates in the event that an obstacle is encountered while the vehicle 10 is operating in a back-track response, that is, when an obstacle is encountered in a work area increment which has previously been explored and was found to contain no obstacle. Such a condition may arise due to cumulative errors in positioning the vehicle 10 with the drive means or when a new obstacle is added to an area while the vehicle is operating.

When an obstacle signal is produced while the drive motors 16 and 18 are operated in response to a back-track response, the back-track error compensating means initiates an adjustment drive response. The adjustment drive response produces a drive signal that is capable of causing the motors 16 and 18 to move the vehicle 10 back to the work area increment occupied prior to the obstacle encounter, that is, back to the area increment in which the back-track response was initiated. If no obstacle is encountered as the vehicle is returned and if there is an obstacle or unexplored marker in an array element adjacent to the array element representing the work area increment in which the collision occurred, the drive signal created in the adjustment drive response drives the vehicle a predetermined distance away from the work area increment represented by the array element having the obstacle or unexplored marker in its status location and the last back-track response is repeated. This time if an obstacle is encountered the initializing means operates to reinitialize the device and the process begins again from a new origin or starting position in the work area. The number of allowed re-initializations can be set as necessary for the application.

If the search processing means implemented in CPU 44 and program memory device 32 analyzes the memory contents of adjacent array elements and finds no array element having an unexplored marker and the array element representing the current work area increment location includes an origin marker, the navigational apparatus shuts the vehicle off along with any work equipment mounted thereon. This contingency indicates that the vehicle has covered all work area increments in the work area to the resolution defined by the size of the work area increments.

Figure 4:
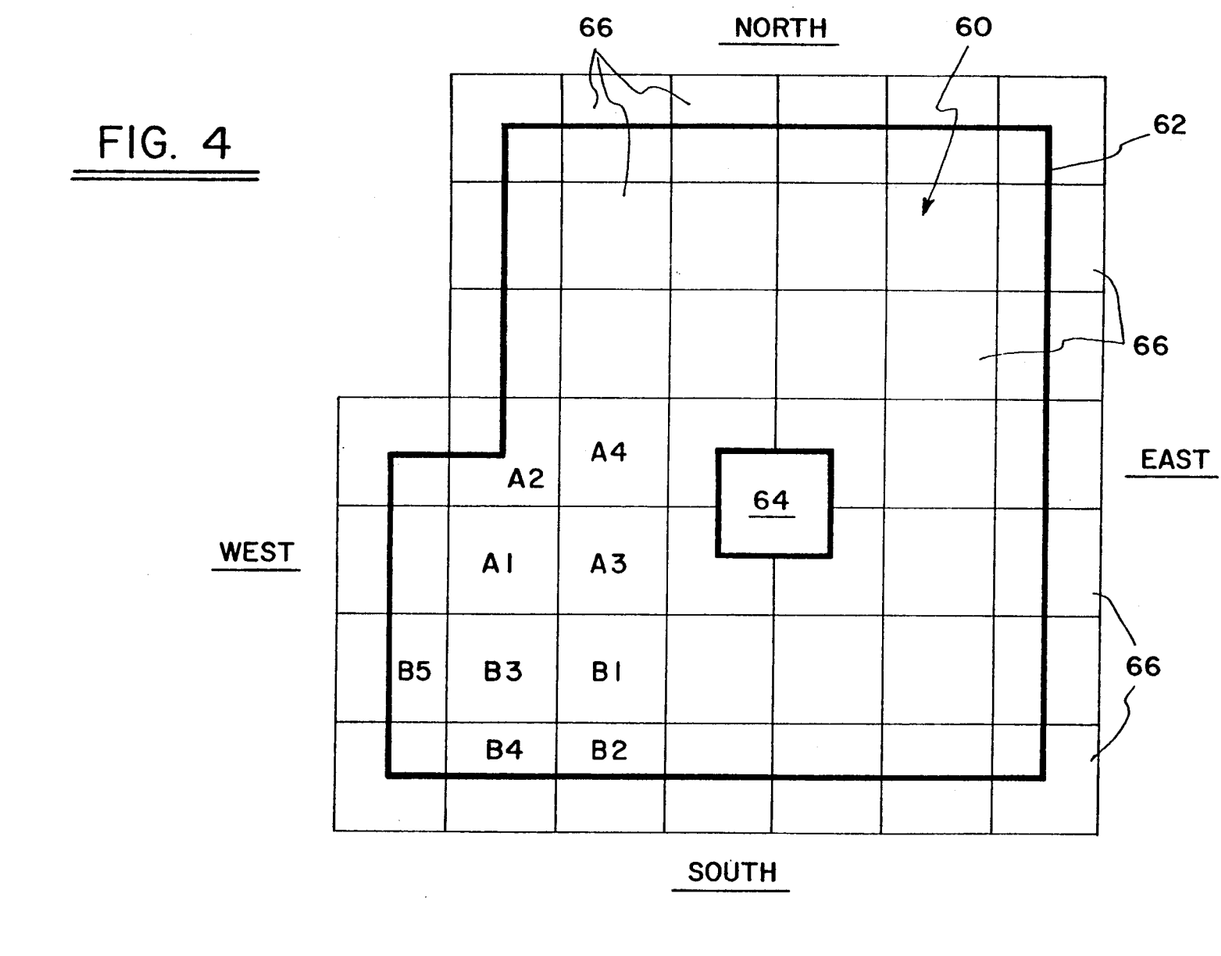
FIG. 4 is a schematic plan view indicating the movement of the vehicle within a work area according to the invention.

FIG. 4 shows a work area 60 having an arbitrary shape and bounded on all sides by a boundary obstacle 62, in this case a wall or closed door, and also having an obstacle 64 located within the work area. The illustrated work area 60 is divided into work area increments 66 each corresponding to a memory array element in the memory array device shown in FIG. 2. The symbols located within the work area increments 66 in FIG. 4 indicate the movements of a vehicle or mobile robot (not shown) operating under the guidance of the navigational apparatus embodying the principles of the invention.

From the origin work area increment A1 the search processing means analyzes the contents of the array elements (not shown) representing adjacent work area increments to the north, east, south, and finally to the west until an adjacent array element that contains an unexplored marker is located. Although this search sequence is used for purposes of illustration, those skilled in the art will appreciate that any consistent search sequence may be employed within the scope of the invention. Finding the array element representing the adjacent work area increment A2 to the north with an unexplored marker in its status location, the search processing means initiates an explore response that creates a drive signal to drive the vehicle to that work area increment. Also in the explore response, the memory mapping means implemented in CPU 44 and memory device 32 records a direction vector indicating "north" and an explored marker in the array element representing area A2. However, as the drive signal is being carried out, the vehicle encounters the obstacle 62 in work area increment A2 which prompts at least one of the obstacle sensors (shown in FIG. 1) to produce an obstacle signal. The obstacle signal is received by the data processing means 30, and causes the return signal means within the data processing means to initiate a return response. The obstacle signal also prompts the memory mapping means to record an obstacle signal in the array element represented by area A2. The return response generates a signal that is directed to the drive motors 16 and 18 and stops the motors prior to completing the instruction provided by the drive signal. The return response then generates a drive signal that causes the motors to drive the vehicle in reverse to return to the origin work area increment A1.

After returning to position A1, the search processing means again analyzes the adjacent array elements in the predetermined sequence until it finds that the array element representing work area increment A3 includes an unexplored marker in its status section. The search processing means implemented by the CPU 44 and program memory 32 then executes an explore response that produces a drive signal for turning the vehicle clockwise 90° and then driving the vehicle the distance indicated by work area increment A3. Also, the explore response also causes the memory mapping means to record an "east" direction vector and an explored marker in the array element representing area A3. From this point the search processing means again sequentially scans the memory contents of array elements representing adjacent work area increments and locates the array element representing work area increment A4, and then initiates another explore response that produces a drive signal capable of turning the vehicle back 90° counterclockwise and driving the vehicle to work area increment A4. This search process continues from area A4 until a back track response is produced.

The work area increments B1 through B5 may be used to describe the back-track processing means implemented through the CPU 44 and program memory device 32. From the work area increment B1 the search processing means initiates an explore response to produce a drive signal to drive the vehicle to work area increment B2. After returning to area B1 in a return response produced in area B2, the vehicle is driven to area B3. The vehicle is then driven to area B4, back to area B3 due to the obstacle in B4, to area B5 from area B3, and finally back to area B3 due to the obstacle in area B5.

At any time during the operation of the apparatus 10 (FIGURE 1) within the work area 60 shown in FIG. 4, the apparatus may be interrupted using the pause control 35 shown in FIGS. 1 and 2. The pause control switch 35 when activated produces a signal that temporarily turns off any equipment on the apparatus 10, and sends an interrupt to the CPU 44 through the interface logic device 46. This leaves the memory array contents unchanged and leaves all computer operation on hold. The pause control thus quiets the apparatus temporarily.

After the vehicle is returned to area B3 from area B5 the search processing means implemented the CPU 44 and program memory device 32 analyzes the memory contents of array elements representing areas A1, B1, B4, and B5 in that sequence. Finding that all of these array elements contain either explored markers or obstacle markers, the back-track processing means implemented through the CPU 44 and program memory device 32 initiates a back-track response. The back-track response produces a signal that directs the drive motors 16 and 18 to drive the vehicle in reverse in the direction opposite to the direction vector contained in the array element representing area B3. Since the area B3 was initially entered from area B1, the array element representing area B3 contains a direction vector indicating "west" and the vehicle thus moves "east" in response to the drive signal produced in the back-track response to reach area B1. This back track response is continued until a search response is produced or the origin increment is once again occupied during the back track response.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the sensor means are described above as electro-mechanical contact switches, other sensor means such as opto-electrical proximity sensors may be employed according to the invention. Such alternate sensor means may not require actual contact between the vehicle and the obstacle to produce an obstacle signal and those would eliminate the suspended shell arrangement described above.

I claim:

1. An autonomous self-navigating vehicle comprising:
   (a) digitally controlled drive means connected to a vehicle structure for driving the vehicle structure along a line across a substantially horizontal and planar work surface in either a forward direction or a rearward direction, and for turning the vehicle structure in either a clockwise direction or counterclockwise direction with zero turning radius;
   (b) obstacle sensor means connected to the vehicle structure for detecting an obstacle adjacent to the vehicle structure and for producing a plurality of obstacle signals, one of the obstacle signals being produced each time the obstacle sensor means detects an obstacle;
   (c) search memory storage means connected to the vehicle structure for storing a two-dimensional memory array having sufficient size to represent a work area in which the vehicle is to operate, the two-dimensional memory array comprising a plurality of array elements, each array element representing a unique work area increment within the work area, and the work area being arbitrarily shaped and bounded entirely by an obstacle; and
   (d) data processing means connected to the vehicle structure for producing a plurality of drive signals that direct the drive means to drive the vehicle into successive work area increments from an origin work area increment represented by an array element containing an origin marker, and for recording in each successive array element corresponding to each said successive work area increment an obstacle marker upon receipt of one of the obstacle signals from the obstacle sensor means, a direction vector indicating the direction taken by the vehicle to initially reach said successive work area increment, and an explored marker until the vehicle reaches the origin work area increment and all adjacent array elements representing work area increments adjacent to the origin work area increment contain either one of the explored markers or one of the obstacle markers.

2. The vehicle of claim 1 wherein the data processing means further includes:
   (a) search processing means for analyzing the memory contents of each array element representing one of the work area increments and for producing the drive signals, the drive signals directing the drive means to drive the vehicle structure into substantially each work area increment represented in the memory array by an array element that includes an unexplored marker.

3. The vehicle of claim 2 wherein the data processing means further comprises:
   (a) memory array mapping means for recording one of the obstacle markers in each array element representing a work area increment into which the vehicle is being driven in response to one of the drive signals when the obstacle sensor means produces one of the obstacle signals, and for recording one of the explored markers and one of the direction vectors into each array element representing a work area increment into which the vehicle is driven in response to one of the drive signals.

4. The vehicle of claim 3 wherein the data processing means further comprises:
   (a) return means for initiating a return response when one of the obstacle signals is produced while the drive means operates in response to one of the drive signals produced by the search processing means, the return response directing the drive means to stop and then drive the vehicle in the opposite direction to the array element representing the work area increment from which the vehicle was being driven when said obstacle signal was produced.

5. The vehicle of claim 4 wherein the data processing means further includes:
   (a) back-track processing means for initiating a back-track response when the search processing means indicates that all array elements adjacent to the array element representing the current location of the vehicle in the work area contain one of the explored markers and said array element representing the current vehicle location does not include the origin marker, the back-track response directing the drive means to drive the vehicle rearwardly to the adjacent work area increment in the direction opposite to the direction indicated by the direction vector in the array element representing the current location of the vehicle in the work area.

6. The vehicle of claim 5 wherein the data processing means further includes:
   (a) back-track error compensating means for producing an adjustment drive response when one of the obstacle signals is produced while the drive means is operated under one of the back-track responses, the adjustment drive response directing the drive means to drive the vehicle a predetermined distance away from an adjacent work area increment represented by an array element having one of the obstacle markers or one of the unexplored markers and being adjacent to the array element representing the work area increment into which the vehicle is driven under said one of the back-track responses.

7. The vehicle of claim 5 wherein the data processing means further includes:

(a) initializing means for clearing the search memory storage means and recording the origin marker in an origin array element located at the center of the two-dimensional memory array in response to an external initialize signal or in response to an initializing obstacle signal produced by the obstacle sensor means when the drive means is being directed by one of the adjustment drive responses or one of the return responses, the origin array element representing an initial location of the vehicle within the work area.

8. A navigational apparatus for navigating an autonomous vehicle within an arbitrarily shaped work area bounded on all sides by an obstacle and comprising a substantially horizontal work surface, the vehicle having digitally controlled drive means for driving the vehicle along a line in either a forward direction or a rearward direction, or about a turn either clockwise or counterclockwise with a zero turning radius, the apparatus comprising:

(a) obstacle sensor means connected to the vehicle for detecting an obstacle within a predetermined proximity of the vehicle as the vehicle is driven by the drive means within the work area and for producing a plurality of obstacle signals, one of the obstacle signals being produced each time the obstacle sensor means detects an obstacle;

(b) search memory storage means connected to the vehicle for storing a two-dimensional memory array having sufficient size to represent the work area, the two-dimensional memory array comprising a plurality of array elements, each array element representing a unique work area increment within the work area; and (c) data processing means connected to the vehicle for producing a plurality of drive signals that direct the drive means to drive the vehicle into successive work area increments in the work area from an origin work area increment represented by an array element containing an origin marker, and for recording in each successive array element corresponding to each said successive work area increment an obstacle marker upon receipt of an obstacle signal from the obstacle sensor means, a direction vector indicating the direction taken to reach said successive work area increment, and an explored marker until the vehicle reaches the origin work area increment and all adjacent array elements representing work area increments adjacent to the origin work area increment contain either one of the explored markers or one of the obstacle markers.

9. The navigational apparatus of claim 8 wherein the data processing means further includes:

(a) search processing means for analyzing the memory contents of each array element representing one of the work area increments and for producing the drive signals, the drive signals directing the drive means to drive the vehicle into substantially each work area increment represented in the memory array by an array element that includes an unexplored marker;

(b) memory array mapping means for recording one of the obstacle markers in each array element representing a work area increment into which the vehicle is being driven in response to one of the drive signals when the obstacle sensor means produces one of the obstacle signals, and for recording one of the explored markers and one of the direction vectors into each array element representing a work area increment into which the vehicle is driven in response to one of the drive signals; and (c) return means for initiating a return response when one of the obstacle signals is produced while the drive means operates in response to one of the drive signals, the return response directing the drive means to stop and then drive the vehicle in the opposite direction to the array element representing the work area increment from which the vehicle was being driven when said obstacle signal was produced.

10. The navigational apparatus of claim 9 wherein the data processing means further includes:

(a) back-track processing means for executing a back-track response when the search processing means indicates that all array elements adjacent to the array elements representing the current location of the vehicle in the work area contained one of the explored markers and said array element representing the current vehicle location does not include the origin indicator, the back-track response directing the drive means to drive the vehicle rearwardly to the adjacent work area increment in the direction opposite to the direction indicated by the direction vector in the array element representing the current location of the vehicle in the work area; and (b) back-track error compensating means for producing an adjustment drive response when one of the obstacle signals is produced while the drive motors are operated under one of the back-track responses, the adjustment drive response directing the drive means to drive the vehicle a predetermined distance away from an adjacent work area increment represented by an array element adjacent to the array element representing the work area increment into which the vehicle is driven under said one of the back-track responses and having one of the obstacle markers or not having one of the explored markers.

11. The navigational apparatus of claim 10 wherein the data processing means further includes:

(a) initializing means for clearing the search memory storage means and recording the origin marker in an origin array element located at the center of the two-dimensional memory array in response to an external initialize signal or in response to an initializing obstacle signal produced by the obstacle sensor means when the drive means is being directed by one of the adjustment drive responses or one of the return responses, the origin array element representing an initial location of the vehicle within the work area.

12. A method for navigating an autonomous vehicle within an arbitrarily shaped work area bounded on all sides by an obstacle and comprising a substantially planar work surface, the vehicle having drive means for driving the vehicle across the work surface along a line in a forward or rearward direction and also for turning the vehicle either clockwise or counterclockwise with zero turning radius, the method comprising the steps of:
- (a) initializing a two-dimensional memory array having sufficient size to represent the work area, the two-dimensional memory array comprising a plurality of array elements, each array element representing a unique work area increment within the work area;
- (b) recording an origin marker in an origin array element located at the center of the two-dimensional memory array, the origin array element representing an initial location of the vehicle within the work area;
- (c) producing drive signals that direct the drive means to drive the vehicle from the origin work area increment represented by the origin array element into successive work area increments until the vehicle reaches the origin work area increment and each adjacent array element representing a different work area increment adjacent to the origin work area increment contains one of a plurality of explored markers;
- (d) prior to initially driving the vehicle into each said successive work area increment in response to one of the drive signals, recording one of the explored markers and a direction vector in each successive array element corresponding to each said successive work area increment into which the vehicle is driven, the direction vector indicating the direction taken by the vehicle to reach said successive work area increment;
- (e) producing an obstacle signal in response to an obstacle in the work area within a predetermined proximity of the vehicle; and
- (f) recording an obstacle marker in the array element representing the work area increment into which the vehicle is being driven upon receipt of the obstacle signal.

13. The method of claim 12 wherein the step of producing drive signals includes:
- (a) analyzing the memory contents of each array element representing one of the adjacent work area increments adjacent to the work area increment representing the current position of the vehicle in the work area, said analyzing step being performed prior to producing each individual drive signal to determine if one of said adjacent work area increments includes an unexplored marker.

14. The method of claim 13 wherein the step of producing drive signals further includes:
- (a) executing a return response in response to each obstacle signal produced while the drive means operates under one of the drive signals;
- (b) stopping the vehicle when said return response is executed; and
- (c) driving the vehicle in the opposite direction to the work area increment from which the vehicle was being driven when said obstacle signal was produced.

* * * * *